(12) United States Patent
Ghosh et al.

(10) Patent No.: US 8,472,967 B2
(45) Date of Patent: Jun. 25, 2013

(54) ALLOCATING TRANSMIT POWER AMONG TWO OR MORE CARRIERS ASSIGNED TO A WIRELESS COMMUNICATION DEVICE

(75) Inventors: Donna Ghosh, San Diego, CA (US); Qingxin Chen, Del Mar, CA (US); Christopher Gerard Lott, San Diego, CA (US); Jun Hu, San Diego, CA (US); Rashid Ahmed Akbar Attar, San Diego, CA (US); Kang Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 711 days.

(21) Appl. No.: 12/362,435

(22) Filed: Jan. 29, 2009

(65) Prior Publication Data

US 2009/0197632 A1    Aug. 6, 2009

Related U.S. Application Data

(60) Provisional application No. 61/025,687, filed on Feb. 1, 2008.

(51) Int. Cl.
*H04W 72/00* (2009.01)
*H04B 7/00* (2006.01)

(52) U.S. Cl.
USPC ......... 455/452.1; 455/450; 455/451; 455/453

(58) Field of Classification Search
USPC .............. 455/522, 69, 127.1, 450, 451, 452.1
See application file for complete search history.

(56) References Cited

U.S. PATENT DOCUMENTS

| 5,604,730 | A | * | 2/1997 | Tiedemann, Jr. | 370/252 |
|---|---|---|---|---|---|
| 6,819,935 | B2 | * | 11/2004 | Kenney et al. | 455/522 |
| 6,996,069 | B2 | * | 2/2006 | Willenegger | 370/252 |
| 7,936,690 | B2 | * | 5/2011 | Willenegger | 370/252 |
| RE42,800 | E | * | 10/2011 | Kenney et al. | 455/522 |
| 2003/0139196 | A1 | * | 7/2003 | Medvedev et al. | 455/522 |
| 2005/0031047 | A1 | * | 2/2005 | Maltsev et al. | 375/260 |
| 2005/0107091 | A1 | * | 5/2005 | Vannithamby et al. | 455/453 |
| 2005/0107107 | A1 | * | 5/2005 | Shahidi et al. | 455/522 |
| 2007/0049317 | A1 | * | 3/2007 | Qi et al. | 455/522 |

FOREIGN PATENT DOCUMENTS

| CN | 1735270 A | 2/2006 |
|---|---|---|
| WO | WO2007120085 A1 | 10/2007 |

OTHER PUBLICATIONS

International Search Report and the Written Opinion, PCT/US2009/032752, International Searching Authority, European Patent Office, Aug. 12, 2009.

* cited by examiner

*Primary Examiner* — Tilahun B Gesesse
(74) *Attorney, Agent, or Firm* — Eric Ho

(57) ABSTRACT

Allocating transmit power among two or more carriers assigned to a wireless communication device is disclosed. In one aspect, a method of allocating transmit power includes determining a total amount of data transmit power available at the wireless communication device for data transmission over the carriers. An efficiency metric is determined for each carrier based on the carrier's transmission characteristics and a portion of the total data transmit power is allocated to each carrier based on each carrier's efficiency metric.

58 Claims, 10 Drawing Sheets

ALLOCATING TRANSMIT POWER AMONG TWO OR MORE CARRIERS ASSIGNED TO A WIRELESS COMMUNICATION DEVICE

CLAIM OF PRIORITY UNDER 35 U.S.C. §119

The present Application for Patent claims priority to Provisional Application No. 61/025,687 entitled "METHOD AND APPARATUS FOR ESTIMATING IN EACH ALLOCATED FREQUENCY CHANNEL (CARRIER) A MAXIMUM DATA RATE AND ITS ASSOCIATED POWER BASED ON TOTAL POWER AVAILABLE AT THE ACCESS TERMINAL FOR MULTICARRIER UPLINK TRANSMISSIONS" filed Feb. 1, 2008, and assigned to the assignee hereof and hereby expressly incorporated by reference herein.

FIELD OF DISCLOSURE

The present disclosure relates generally to circuits, and more specifically to techniques, systems, and methods for allocating transmit power among two or more carriers suitable for wireless communication and other applications.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

MIMO systems employ multiple (NT) transmit antennas and multiple (NR) receive antennas for data transmission. A MIMO channel formed by the NT transmit and NR receive antennas may be decomposed into NS independent channels, which are also referred to as spatial channels or carriers. Each of the NS independent channels corresponds to a dimension. These multicarrier systems can provide improved performance if the additional dimensionalities created by the multiple transmit and receive antennas are utilized. For example, each device can be provided with two or more carrier frequencies on which to transmit information, which can lead to higher throughput and/or greater reliability.

Such multicarrier systems, however, present significant technical challenges beyond their single carrier predecessors. One such challenge is the division of transmission power among the multiple carriers. Each mobile device has a finite amount of transmit power available for uplink data and overhead transmissions that needs to be allocated to the various carriers the device is using. In a single carrier system, no such allocation is necessary as the entirety of the available transmit power could be applied to the lone carrier. Accordingly, allocation of available transmit power is not a simple extension of single carrier concepts to a multicarrier system.

SUMMARY

Exemplary embodiments of the invention are directed to systems and method for allocating transmit power among two or more carriers.

One embodiment is directed to a method of allocating transmit power among two or more carriers assigned to a wireless communication device. In this embodiment, the method comprises: determining a total amount of data transmit power available at the wireless communication device for data transmission over the carriers; determining an efficiency metric for each carrier based on the carrier's transmission characteristics; and allocating a portion of the total data transmit power to each carrier based on each carrier's efficiency metric.

Another embodiment is directed to a wireless communication device for communicating with a communication network over two or more assigned carriers. In this embodiment, the wireless communication device comprises: logic configured to determine a total amount of data transmit power available at the wireless communication device for data transmission over the carriers; logic configured to determine an efficiency metric for each carrier based on the carrier's transmission characteristics; and logic configured to allocate a portion of the total data transmit power to each carrier based on each carrier's efficiency metric.

Another embodiment is directed to a wireless communication device for communicating with a communication network over two or more assigned carriers. In this embodiment, the wireless communication device comprises: means for determining a total amount of data transmit power available at the wireless communication device for data transmission over the carriers; means for determining an efficiency metric for each carrier based on the carrier's transmission characteristics; and means for allocating a portion of the total data transmit power to each carrier based on each carrier's efficiency metric.

Another embodiment is directed to a computer readable medium comprising code, which, when executed by a processor, causes the processor to perform operations for allocating transmit power among two or more carriers assigned to a wireless communication device. In this embodiment, the computer readable medium comprises: code for determining a total amount of data transmit power available at the wireless communication device for data transmission over the carriers; code for determining an efficiency metric for each carrier based on the carrier's transmission characteristics; and code for allocating a portion of the total data transmit power to each carrier based on each carrier's efficiency metric.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
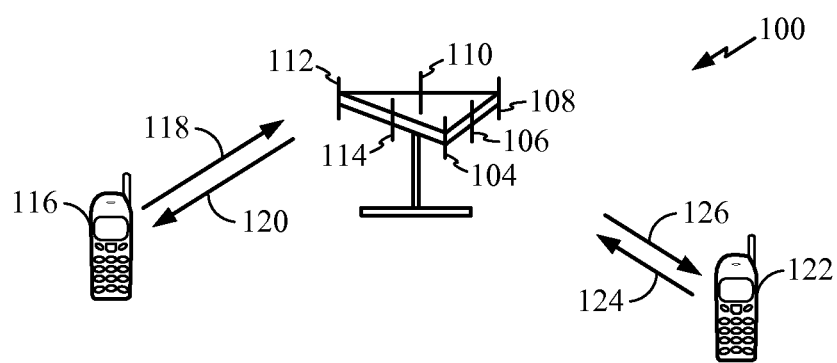
FIG. 1 illustrates a multiple access wireless communication system according to one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

One other exemplary telecommunications standard for the wireless transmission of data through radio signals that provides an illustrative platform for the following descriptions is an Evolution-Data Optimized or Evolution-Data system (which is often abbreviated as EV-DO, EVDO or EV). EV-DO utilizes multiplexing techniques (e.g., CDMA and FDD) to maximize the amount of data transmitted. EV-DO is standardized by 3rd Generation Partnership Project 2 (3GPP2) as part of the CDMA2000 family of standards. EV-DO has been adopted by many mobile phone service providers worldwide particularly those previously employing CDMA networks. There are different revisions or versions of EV-DO. For example, there is EV-DO Revision 0, Revision A and Revision B. For clarity, certain aspects of the techniques are described below for EV-DO, and EV-DO terminology is used in much of the description below. It will be appreciated that the methods and apparatuses described herein in the context of a wireless communication system utilizing EV-DO—Revision B are for illustration purposes only. Such descriptions are not intended to limit various embodiments of the invention to that particular scheme, as the mechanisms, techniques, methods and apparatuses are equally applicable to any other wireless communication system that implements telecommunications standards which utilize multiple carriers.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As discussed in the background, mobile devices have a finite amount of transmit power available for uplink data and overhead transmissions. In multicarrier systems, the total available transmit power needs to be allocated to the various carriers being used by the mobile device. However, allocation of transmit power can be achieved in many ways according to varying performance trade-offs. Accordingly, mechanisms, techniques, methods and apparatuses for estimating or determining in each allocated frequency channel a maximum data rate and its associated power based on total power available at the mobile device for multicarrier uplink transmissions are presented below.

In EV-DO Rev. B, for example, an access terminal (AT) can be assigned by an access network (AN) multiple frequency channels (or carriers) for uplink (or reverse link) data and overhead transmissions. Since the AT's power amplifier has a maximum transmit power, a technique is needed to divide the transmit power among the different carriers. Accordingly, in an EV-DO Rev. B system, embodiments of the invention provide a Power Amplifier (PA) Headroom Estimation algorithm based on the total transmit power available at the AT (Pmax) to determine a maximum sustainable traffic-to-pilot (T2P) power allocation in each carrier r for data transmissions (T2P_Pmax_r). In general, the AT can then choose a data rate corresponding to the transmit T2P power (TxT2P_r) in a given carrier r based on the allocated T2P_Pmax_r.

FIG. 1 illustrates a multiple access wireless communication system according to one embodiment of the invention.

As shown, an access point (AP) 100 includes multiple antenna groups, one including 104 and 106, another including 108 and 110, and an additional one including 112 and 114. In FIG. 1, only two antennas are shown for each antenna group, however, more or fewer antennas may be utilized for each antenna group. AT 116 is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from AT 122 over reverse link 124. In a FDD system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. In the embodiment of FIG. 1, the different antenna groups are each designed to communicate with ATs in a given sector covered by AP 100.

In communication over forward links 120 and 126, the transmitting antennas of AP 100 may utilize beamforming in order to improve the signal-to-noise ratio (SNR) of forward links for the different ATs 116 and 124. In general, an AP using beamforming to transmit to ATs scattered randomly through its coverage causes less interference to ATs in neighboring cells than an AP transmitting through a single antenna to all its ATs.

An AP is generally a fixed station used for communicating with the other terminals and may also be referred to as a base station, a Node B, or some other terminology. An AT may also be referred to as a mobile station, user equipment (UE), a wireless communication device, a terminal, or some other terminology.

Referring back to FIG. 1, each reverse link carrier assigned to the ATs 116, 122 has a pilot signal associated therewith. The AP 100 can independently control each pilot signal's power level by sending a series of reverse power control (RPC) commands (e.g., up, down, hold) on the associated forward links to the corresponding AT 116, 122. The AT 116, 122 tries to follow the RPC commands to keep the pilot signals reliable, otherwise the channels will not be properly decoded by the AP 100. Further, it is typically desirable to control the overall interference from the multiple ATs 116, 122 in each sector or each cell by use of the RPC commands because as interference increases, the edge users (i.e., those furthest away from the AP 100) may run out of available transmit power and no longer be able to follow RPC commands issued by the AP 100. In this case, the edge users can no longer participate in communication with the AP 100 and the cell size effectively shrinks, thereby limiting the number of users the cell can serve, wasting resources, etc.

Figure 2:
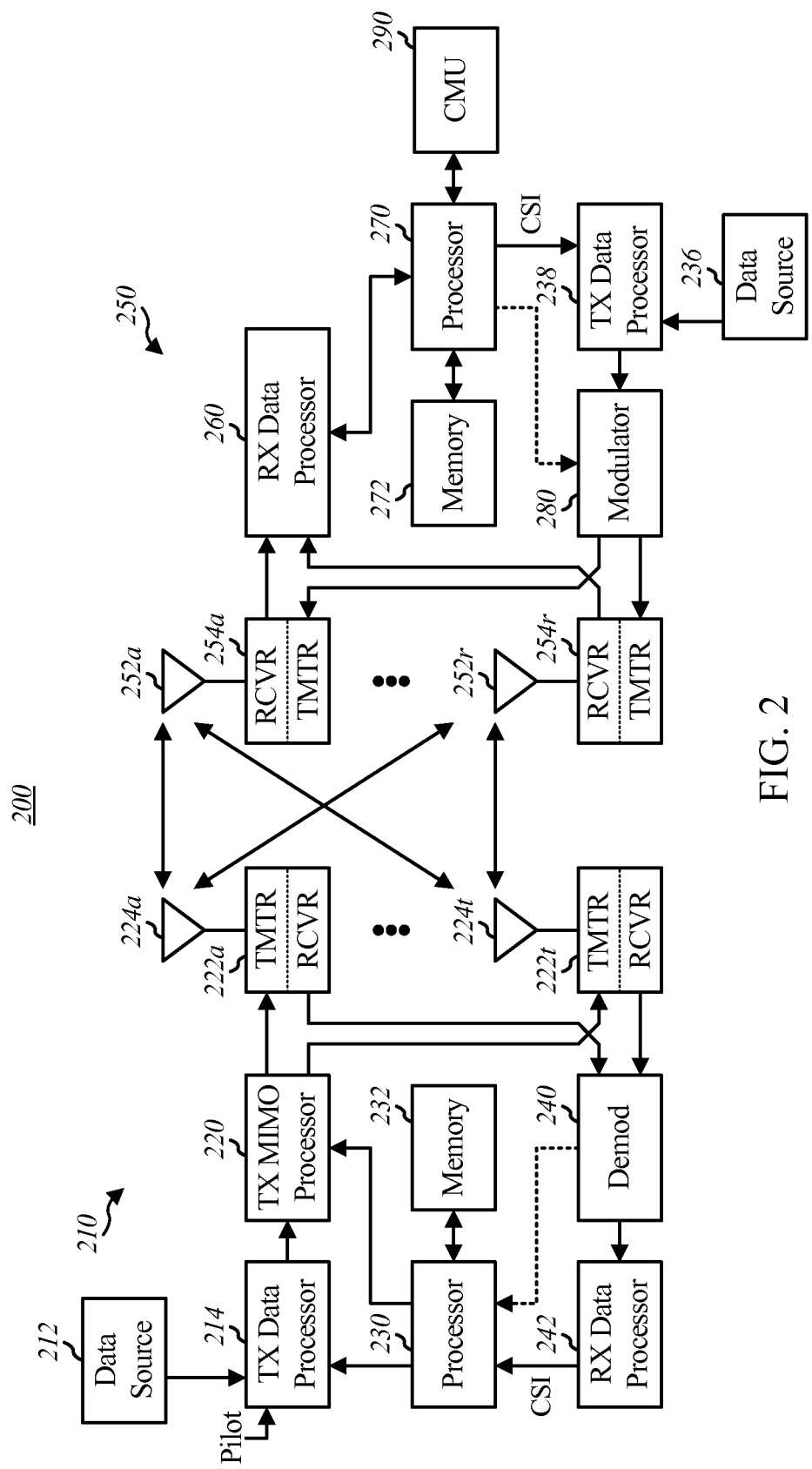
FIG. 2 is a block diagram design of an AP transmitter system and an AT receiver system in a MIMO system.

FIG. 2 is a block diagram design of an AP transmitter system 210 and an AT receiver system 250 in a MIMO system 200.

At the AP 210, traffic data for a number of data streams is provided from a data source 212 to a transmit (TX) data processor 214. According to one or more embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques in some embodiments. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at AP 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to AP 210.

At AP 210, the modulated signals from AT 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

As discussed above with reference to FIG. 1, pilot signal strengths are continuously monitored and adjusted throughout a call based on changing channel conditions. The reverse link transmission power is controlled by two power control loops, an open loop and a closed loop. The open loop generates an estimate of the reverse link quality metric, (e.g., a path loss). The estimated path loss is then translated into a required transmit power (TxOpenLoopPwr) in accordance with other factors, such as loading at the AP 210. The function of the closed loop is to correct the open loop estimate, which does not take into account environmentally induced phenomena, such as shadowing, and other user interference, to achieve a desired signal quality (e.g., signal-to-noise ratio (SNR), controlled dynamically using an outer loop with a performance criterion such as maintaining target PER in the traffic channel) at the AP 210. The objective can be achieved by measuring the quality metric of the reverse link and reporting the results of the measurement back to the AT 250. For example, the AP 210 can measure a reference signal (e.g., a pilot SNR) transmitted over the reverse link, and provide feedback (e.g., RPC commands) to the AT 250, which determines the required closed loop transmit power adjustment (TxClosedLoopAdj). Both open loop and closed loop power control are well known in the art, as is outer loop power control, and so a further description here will be omitted.

According to various embodiments of the invention, the AT 250 can be further configured to do one or more of the following: allocate the total available transmit power across multiple uplink carriers efficiently for data and overhead transmissions, dynamically reallocate unused power among the uplink carriers using a quality metric, maintain an adaptive power margin in each carrier to more effectively follow power control commands, guarantee a minimum amount of power to one or more higher priority carriers, and determine a maximum sustainable uplink data rate in each carrier based on the power available for data transmission in each carrier. Each of the above functions will be described in detail below.

Allocation of Transmit Power

According to various embodiments, an AT allocates its finite total transmit power (Pmax) across its uplink pilot, overhead, and data channels based on certain criteria. The AT may be any of the ATs 116, 122 described above with reference to FIG. 1, and may be configured as illustrated in FIG. 2, for example.

Figure 3:
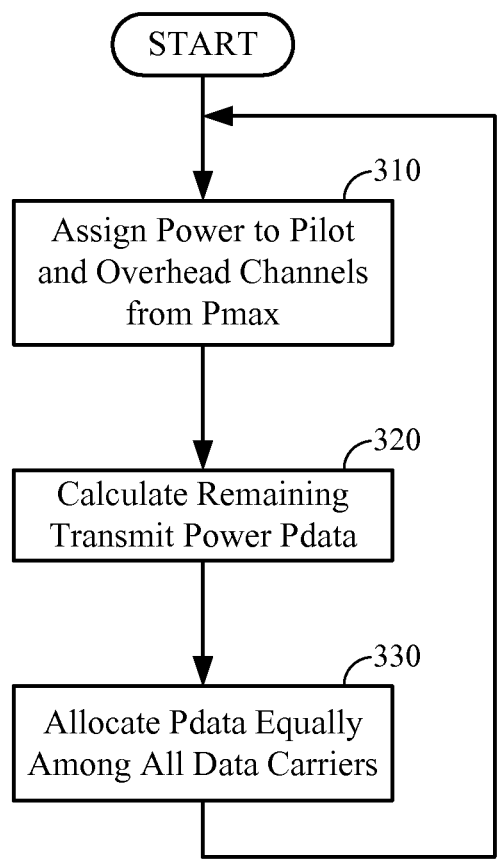
FIG. 3 illustrates a flow diagram for allocating transmit power among multiple carriers according to one embodiment of the invention.

FIG. 3 illustrates a flow diagram for allocating transmit power among multiple carriers according to one embodiment of the invention.

In the design of FIG. 3, the AT simply divides Pmax equally among all the carriers. From the total power Pmax, each pilot and overhead channel is initially assigned an appropriate amount of power (block 310). The remaining power (Pdata) (block 320) is then divided equally among the reverse link data channels (block 330). Advantages of this design include its relative simplicity, but there are obvious drawbacks as well. The equal division of transmit power in FIG. 3 can be overly simplistic in certain applications because it treats each channel as equal when there may in fact be widely varying interference levels. In the design of FIG. 3, the total available transmit power is nevertheless allocated to each channel at a fixed, common level. This design does not consider many of the trade-offs or complexities that often arise when different noise levels exist in the different channels assigned to the AT.

Data rates, for example, are typically non-linear, meaning that disproportionately higher amounts of power are required to sustain higher data rates. Accordingly, even though interference in a given channel may be relatively low, operating that channel at a higher data rate requires more power to achieve the same packet error rate (i.e., same performance) than would be required for operating that channel at a lower data rate. Thus, distributing the limited transmit power in an equal manner irrespective of individual channel conditions and/or requirements may waste power on the more inefficient channels.

Figure 4A:
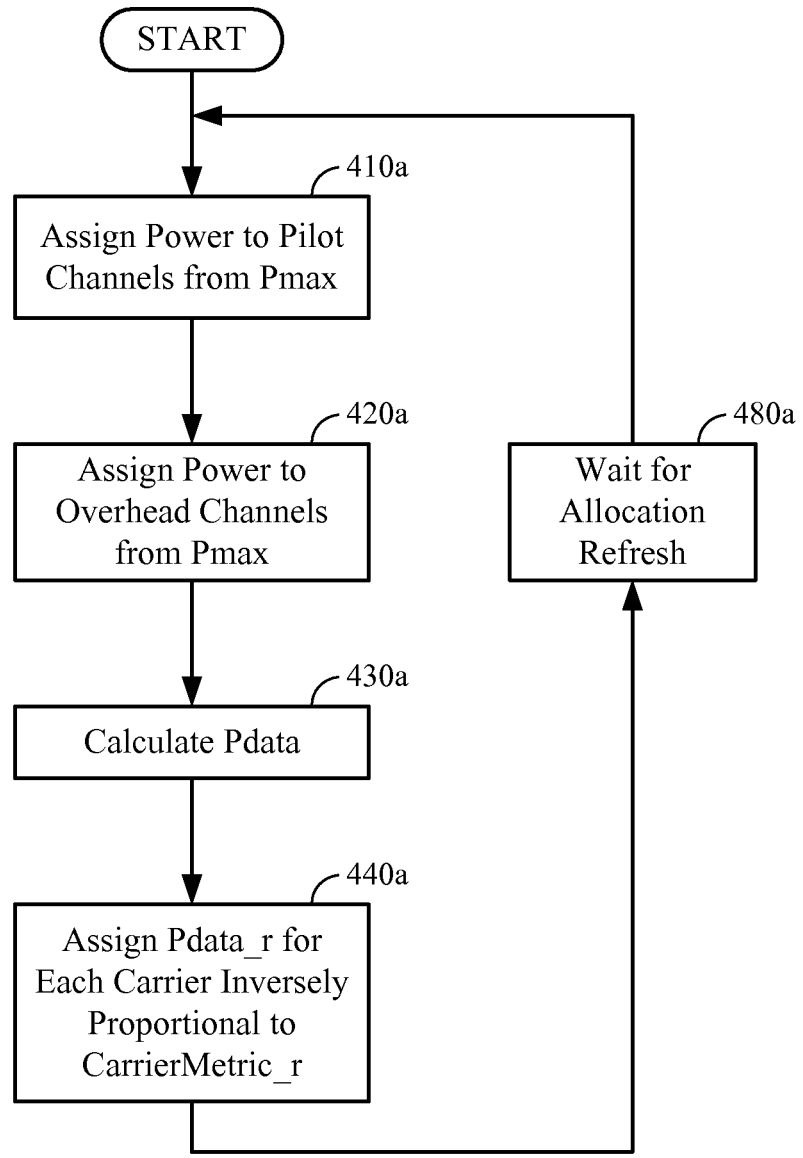
FIGS. 4A and 4B illustrate block diagrams for allocating transmit power among multiple carriers in a spectral efficient manner according to other embodiments of the invention.
Figure 4B:
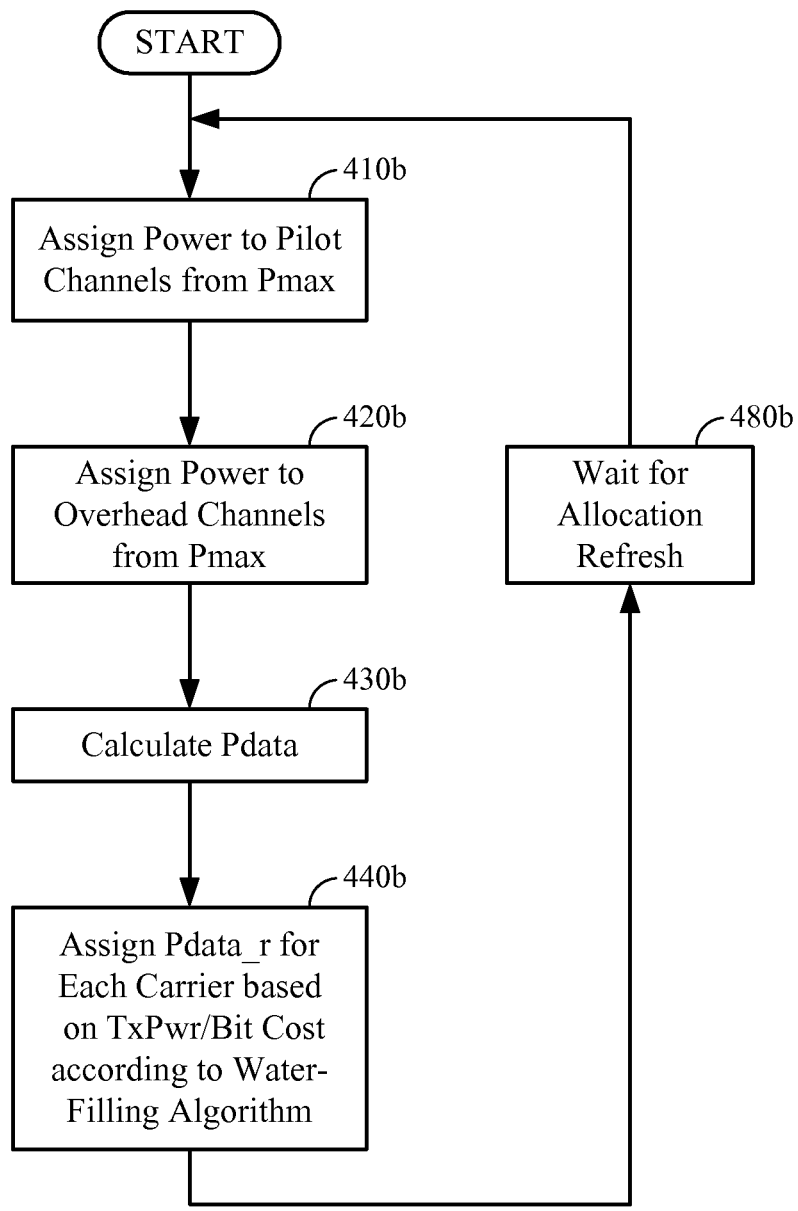

FIGS. 4A and 4B illustrate block diagrams for allocating transmit power among multiple carriers in a spectral efficient manner according to other embodiments of the invention.

In the designs of FIGS. 4A and 4B, the AT allocates transmit power in a spectral efficient manner based on the energy per bit over the interference power spectral density (Eb/Nt) of each channel. Eb/Nt represents the effective cost for transmitting one bit with a certain packet error rate. Thus, by improving the Eb/Nt efficiency, the AT increases the number of bits that can be transmitted using the fixed amount of available transmit power Pmax. The AT benefits by being able to transmit more data, but the network as a whole also benefits by causing less interference to other ATs in the network for the same amount of data. This effectively reduces the interference cost of data transmissions from each AT (e.g., ATs 116, 122 of FIG. 1).

More specifically, the AT obtains better Eb/Nt efficiency by favoring uplink transmissions on carriers with better carrier efficiency metrics. Example efficiency metrics include the average transmit pilot power, a filtered reverse activity bit (FRAB), etc. It is often desirable to filter the efficiency metric over a long-term average to smooth out transient noise. Tracking long-term interference as opposed to instantaneous channel radiation provides more stable operation with less oscillation. Example filtering methods include a moving window average with a time constant of a desired length, infinite impulse response (IIR) filtering, etc. Relatively heavy filtering (e.g., a window on the order of a few seconds) can allow tracking of even relatively slowly fading channels.

Referring back to FIGS. 4A and 4B, the AT initially allocates power from Pmax to each pilot channel (blocks 410a and 410b) and each overhead channel according to their respective transmit powers (blocks 420a and 420b). The remaining transmit power Pdata is available for allocation across the data channels in an Eb/Nt efficient manner according to each data channel's efficiency metric (e.g., pilot channel transmit power) (blocks 430a and 430b).

For example, in an EV-DO system, a PA Headroom Estimation algorithm according to an embodiment of the invention calculates the total available data transmit power Pdata at time t, across all carriers r in the set of total uplink data carriers M at the AT, according to Equation 1:

$$P\text{data}(t) = P\text{max} - \Sigma r \in M \{p\_r(t) \times (1 + O\_r(t))\}, \quad (1)$$

where Pmax again denotes the maximum total available transmit power at the AT, p_r(t) denotes the long-term average (e.g., filtered) transmit pilot power (an example carrier efficiency metric) in carrier r at time t, and O_r(t) denotes the total uplink overhead channel gain with respect to the pilot power in carrier r at time t. The overhead channel gain O_r(t) may include, for example, the data source control (DSC) channel gain, the data rate control (DRC) channel gain, the reverse rate indicator (RRI) channel gain, the acknowledgement (ACK) channel gain, etc.

In the design of FIG. 4A, the AT allocates Pdata inversely proportional to the average carrier efficiency metric of each channel (block 440a). That is, each carrier is allocated a portion of Pdata equal to the ratio of the inverse of its carrier efficiency metric and the sum of the inverses of all the carrier efficiency metrics over all of the data channels. Continuing with the example EV-DO system, the PA Headroom Estimation algorithm calculates for each carrier r in the set of total uplink data carriers M at the AT, an allocated transmit power Pdata_r according to Equation 2:

$$P\text{data}\_r(t) = P\text{data}(t) \times \{1/[\text{CarrierMetric}\_r(t) \times (\Sigma r \in M\ 1/\text{CarrierMetric}\_r(t))]\}, \quad (2)$$

where Pdata(t) can be calculated above from Equation 1 or elsewhere as detailed herein, and CarrierMetric_r(t) denotes the desired measure of carrier efficiency. Effectively, the goal is to allocate more power to the data channel of a carrier with lower interference so that the AT's transmissions are more spectral efficient. Carrier efficiency metrics like average transmit pilot power or filtered reverse activity bit, for example, indicate the interference level in the carrier, e.g., the higher the average transmit pilot power, or filter reverse activity bit, the higher the interference level in that carrier. Hence the higher the transmit pilot power, or the filtered reverse activity bit, the lower the allocated data channel power in that carrier should be in order to favor spectral efficient transmissions at the AT. Equation 2 therefore allocates power inversely proportional to the carrier efficiency metric. However, it will be appreciated that in some embodiments the selected carrier efficiency metric may be such that a high value indicates a low interference level. In such embodiments, Equation 2 is modified to allocate power directly proportional, as opposed to inversely proportional, to the carrier efficiency metric.

In the design of FIG. 4B, the AT allocates Pdata according to water-filling techniques based on an estimated transmit power per bit (TxPwr/Bit) cost (block 440b). As discussed earlier, the TxPwr/Bit depends on the data rate at which the channel is operating. In general, higher data rates require more power to achieve the same packet error rate (i.e., same performance). Returning again to the example EV-DO system, the TxPwr/Bit for a given packet k TxPwr/Bit_k (i.e., given data rate) in a given carrier r at time t can be calculated according to Equation 3:

$$T\!x\!P\!wr/\text{Bit}\_k\_r(t) = p\_r(t) \times \text{ChipRate} \times (\text{TermTarget}\_k \times T\!x\!T2P\_k)/(\text{PktSize}\_k), \quad (3)$$

where p_r(t) again denotes the long-term average (e.g., filtered) transmit pilot power (an example carrier efficiency metric) in carrier r at time t, ChipRate denotes the number of pulses per unit time at which the code is transmitted, TermTarget_k denotes the transmit duration for packet k, TxT2P_k denotes the transmit T2P for packet k, and PktSize_k denotes the number of information bits in packet k.

With reference back to FIG. 4B, the AT in this design allocates Pdata according to a water-filling scheme in the TxPwrBit cost domain. In the water-filling scheme design of FIG. 4B, Pdata is allocated such that spectral efficiency is increased across transmissions on all reverse link carriers allocated to the terminal. The lower the TxPwrBit cost, the better the spectral efficiency of that carrier and the lower the interference seen by the terminal in that carrier. The goal of the water-filling algorithm is to allocate power such that the carriers with low Eb/Nt get filled first, and then if any extra power remains, the carriers with higher Eb/Nt get filled. Water-filling distribution in general is described, for example, by Robert G. Gallager, in "Information Theory and Reliable Communication," John Wiley and Sons, 1968, which is incorporated herein by reference.

In some embodiments, the AT uses an explicit evaluation of the TxPwr/Bit cost for each data rate k in each carrier r as calculated in Equation 3 and described above. However, in other embodiments the AT can use an average, maximum, or minimum TxPwr/Bit cost evaluation over all data rates k in each carrier r. Using these measures of the TxPwr/Bit cost allows a user to trade-off the desired accuracy, computational costs, data rate coverage, etc.

Allocating transmit power inversely proportional to the average carrier efficiency metric of each carrier as in the design of FIG. 4A gives approximate results for Eb/Nt efficiency at a relatively low computational cost. For example, when using the time-averaged pilot transmit power of each carrier as the efficiency metric, the computations include a relatively small number of algebraic manipulations based on readily available efficiency values. Allocating transmit power according to the water-filling method as in the design of FIG. 4B is more accurate than the inversely proportional method of FIG. 4A. However, the increased accuracy is more computationally intensive. The design choice is therefore application specific.

Another advantage of the designs of FIGS. 4A and 4B is that the AT actively performs distributed load balancing across its carriers without explicit coordination from the AP. Load balancing in this context refers to keeping the interference level across all carriers relatively equal. Here, the AT has unique knowledge of its own transmit pilot power, which is an estimate of how much interference there is in each carrier. On a per packet basis, the AT operating in accordance with various embodiments of the invention helps to do load balancing across carriers by favoring carriers with less interference. The AP does do load balancing as well, but at a much longer time scale (e.g., call arrival time scale). By balancing their own carriers, each AT (e.g., ATs 116, 122 of FIG. 1) assists in overall network load balancing.

Allocation of transmit power in accordance with one or more embodiments described herein provides an estimate of how much transmit power to allocate each carrier. However, due to the time varying nature of wireless communication channels, these estimates may become unreliable over time. It is therefore desirable to the refresh transmit power allocation periodically (blocks 480a and 480b). If the allocated power is changed too frequently, then continuing transmissions may be adversely affected. On the other hand, if it is updated too slowly, then the power allocation will be stale with respect to actual interference levels. In one embodiment, the transmit power allocation is updated relatively frequently (e.g., on the order of one to two milliseconds). Here, the instantaneous values are filtered over a relatively large time constant (e.g., on the order of one to two minutes), and the final filtered transmit power allocation is used for the data channel transmissions in each reverse link carrier.

Power Margins

In some applications, it is desirable to use less than the maximum available transmit power Pmax. As discussed above with reference to FIG. 1, each AT 116, 122 tries to follow RPC commands received from AP 100 to keep their pilot signals reliable. Without reliable pilot signals, the channels will not be properly decoded. However, the channels are time varying in nature and the received RPC commands are not, in general, predictable from the AT's perspective. Sometimes the RPC commands instruct the AT to decrease a certain carrier's transmit power if conditions have improved, and sometimes to increase that carrier's transmit power if the channel is fading in time, etc. If the AT uses its entire available transmit power Pmax at any given instant, it will not be able to follow an increase RPC command because there will not be any available power for it.

To allow for changing channel conditions, in some embodiments the AT keeps a transmit power margin (TxPwrMargin) on one or more carriers. The TxPwrMargin is an amount of power allocated to a particular carrier but not actually used (at least initially) for data transmission. The TxPwrMargin is essentially reserve power available to the carrier when needed to follow a received RPC command or some other purpose.

Figure 5:
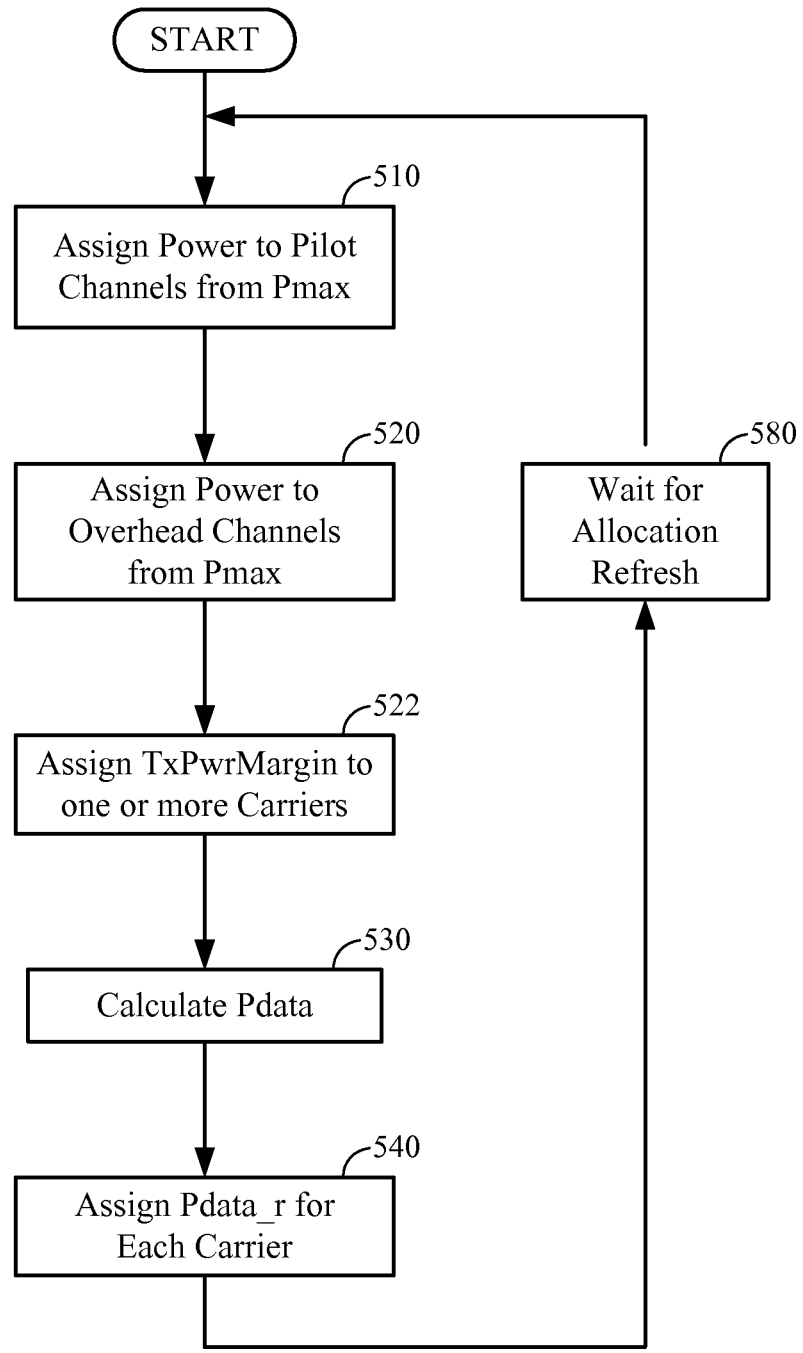
FIG. 5 is a flow diagram illustrating allocation of transmit power among multiple carriers where one or more of the carriers maintain an adaptive power margin according to an embodiment of the invention.

FIG. 5 is a flow diagram illustrating allocation of transmit power among multiple carriers where one or more of the carriers maintain an adaptive power margin according to an embodiment of the invention.

Following the designs of FIGS. 4A and 4B, in the design of FIG. 5 the AT initially allocates power from Pmax to each pilot channel (block 510) and to each overhead channel according to their respective gains (block 520). Before allocating transmit power across the data channels, however, in the design of FIG. 5 the AT initially allocates an adaptive power margin to one or more carriers from the remaining transmit power (block 522). The power margin allows that carrier to follow received RPC commands during ongoing data and overhead transmissions, etc., as discussed above. After the power margins have been allocated, the AT allocates the remaining data transmit power Pdata among the uplink data carriers in an Eb/Nt efficient manner according to each data channel's efficiency metric using any of the techniques described above (blocks 530-580).

For example, in an EV-DO system in which one or more carriers keep a power margin TxPwrMargin, a PA Headroom Estimation algorithm according to an embodiment of the invention calculates the total available data transmit power Pdata at time t, across all carriers r among the set of total uplink data carriers M at the AT, according to equation 4:

$$P\text{data}(t) = P\text{max} - \Sigma_{r \in M} \{\delta\_r(t) \times p\_r(t) \times (1 + O\_r(t))\}, \quad (4)$$

where Pmax again denotes the maximum total available transmit power at the AT, $\delta\_r(t)$ denotes the back-off power margin TxPwrMargin with regard to the pilot power in carrier r at time t, $p\_r(t)$ again denotes the long-term average (e.g., filtered) transmit pilot power (an example carrier efficiency metric) in carrier r at time t, and $O\_r(t)$ again denotes the total uplink overhead channel gain with regard to the pilot power in carrier r at time t. Again, the overhead channel gain $O\_r(t)$ may include, for example, the DSC channel gain, the DRC channel gain, the RRI channel gain, the ACK channel gain, etc. Pdata(t) is then available for allocation among the uplink data carriers.

It will be appreciated that not all of the carriers need to maintain a power margin in the design of FIG. 5. If a particular carrier does not need or desire to maintain a power margin, $\delta\_r(t)$ can be set to unity (i.e., 0 dB). In the limit where none of the carriers r keep a power margin, Equation 4 simply reduces to Equation 3 described above.

The size of the TxPwrMargin in each carrier determines the extent to which future RPC commands can be followed, but also limits the data rate at which the AT can transmit by reducing the effective available transmit power at any given time. In general, increasing the TxPwrMargin increases the connection's reliability, while reducing the TxPwrMargin increases the allowed reverse link data rate. Accordingly, the AT tries to keep enough of a power margin in each carrier so that it can follow the RPC commands reliably, but small enough so as to not unduly limit the data transmit power, and hence, allowed data rate.

In one embodiment, the AT chooses a fixed TxPwrMargin size (e.g., 3 dB, 10 dB, etc.) for use throughout the entire call duration. The fixed power margin design is relatively simple and low cost, but does not actively track channel conditions, which may lead to inefficiencies as channel conditions change. Naturally, choosing a power margin that is too small may not be sufficient to actually allow the AT to follow successive RPC increase commands if the channel deteriorates significantly. Furthermore, choosing an unnecessarily large value of TxPwrMargin limits the AT to a conservative reverse link data rate while lowering user throughput and possibly diminishing reverse link capacity. If channel conditions become more favorable during transmission, for example, the channel may able to sustain a higher data rate by using a smaller margin than the chosen fixed value.

Accordingly, in other embodiments the AT dynamically adjusts the power margin based on the current channel conditions to make it adaptive in time.

Figure 6:
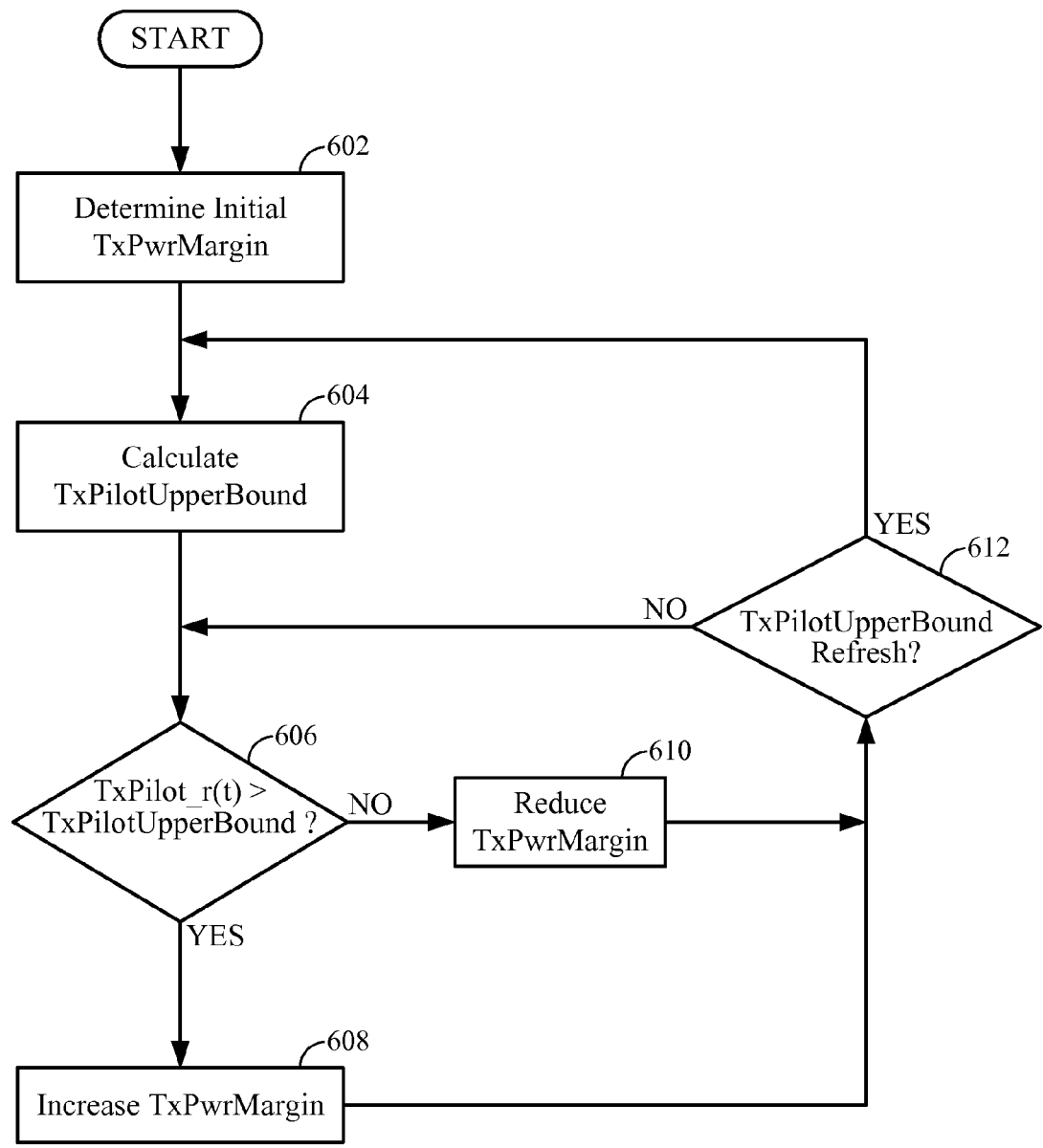
FIG. 6 is a flow diagram for dynamically adjusting power margins for one or more carriers according to an embodiment of the invention.

FIG. 6 is a flow diagram for dynamically adjusting power margins for one or more carriers according to an embodiment of the invention.

As shown, an initial value of the TxPwrMargin is selected in accordance with expected channel conditions (e.g., $\delta\_r(t)$ equal to 3 dB, 5 dB, etc.) (block 602), as in the static power margin design. From its initial value, the TxPwrMargin is adjusted through a feedback signal on a per carrier basis, keeping it sensitive to individual channel conditions.

In one embodiment, the feedback signal includes the TxOpenLoopPwr and the TxClosedLoopAdj pilot signal controls from the open loop and closed loop power control discussed above with reference to FIG. 2. Here, the AT determines an upper bound on the total transmit pilot power (TxPilotUpperBound) above which the AT will be unable to follow subsequent RPC commands received from the AP 100 given the current value of the TxPwrMargin. TxPilotUpperBound is computed as the sum of the TxOpenLoopPwr, the TxClosedLoopAdj, and the $\delta\_r(t)$ (block 604). The TxPilotUpperBound can be computed initially at a given instant in time and updated periodically as desired (block 612). In one embodiment, the TxPilotUpperBound is computed once per average packet transmit duration.

The TxPwrMargin is then adjusted by comparing the TxPilotUpperBound to the total transmit pilot power TxPilot_r(t) (block 606). This adjustment may be done quite frequently, such as once every slot, or once every RPC command. If TxPilot_r(t) is greater than TxPilotUpperBound, the TxPwrMargin is incremented by PwrMarginUpStep (block 608). In addition, if the AT cannot follow a received RPC command for a particular carrier r, the TxPwrMargin would also be incremented by PwrMarginUpStep. Otherwise, the TxPwrMargin is decremented by PwrMarginDownStep (block 610). In one embodiment, the PwrMarginUpStep is 0.5 dB and the PwrMarginDownStep is 0.05 dB. The ratio of the PwrMarginUpStep and the PwrMarginDownStep indicates the percentage of time that the TxPilot_r(t) is allowed to exceed the TxPilotUpperBound and provides a control knob to adjust the performance of the TxPwrMargin loop. In some embodiments, the value of TxPwrMargin is further limited between a minimum value TxPwrMarginMin and a maximum value TxPwrMarginMax. In one embodiment, the TxPwrMarginMin is 0 dB and TxPwrMarginMax is 6 dB. The updated TxPwrMargin is then available for use in allocating or reallocating Pdata among the multiple carriers, e.g., by adjusting $\delta\_r(t)$ as in Equation 4.

In some embodiments TxPilot_r(t) is the instantaneous transmit pilot power at time t in carrier r, while in other embodiments TxPilot_r(t) is the peak transmit pilot power over a time period in carrier r. The peak transmit pilot power value can be maintained over a sliding time window. In one embodiment, the TxPilot_r(t) in each carrier r at time t is determined by summing the TxOpenLoopPwr_r(t) and the TxClosedLoopAdj_r(t) as discussed above with reference to FIG. 2.

Minimum Guaranteed Allocation

In some applications, it is desirable to allocate a guaranteed minimum amount of power to one or more carriers. For example, in some systems each reverse link carrier has a priority associated with it, and the AT may want to ensure that the highest priority carrier(s) have a given amount of power allocated to them. In some embodiments, one high priority carrier is the carrier who transmitting signaling messages. In an EV-DO system, for example, a high priority carrier may be the carrier which is mapped to the MAC flow 00, i.e. the signaling flow in RTCMAC that carries the signaling messages over-the-air. Here, the AT guarantees a minimum amount of transmission T2P (TxT2Pmin) to each high priority carrier. TxT2Pmin is configurable by the AP. Thus, the AT can improve the probability that signaling message transmission is successful by guaranteeing that a minimum amount of transmit power will be available to the appropriate carrier(s).

Figure 7:
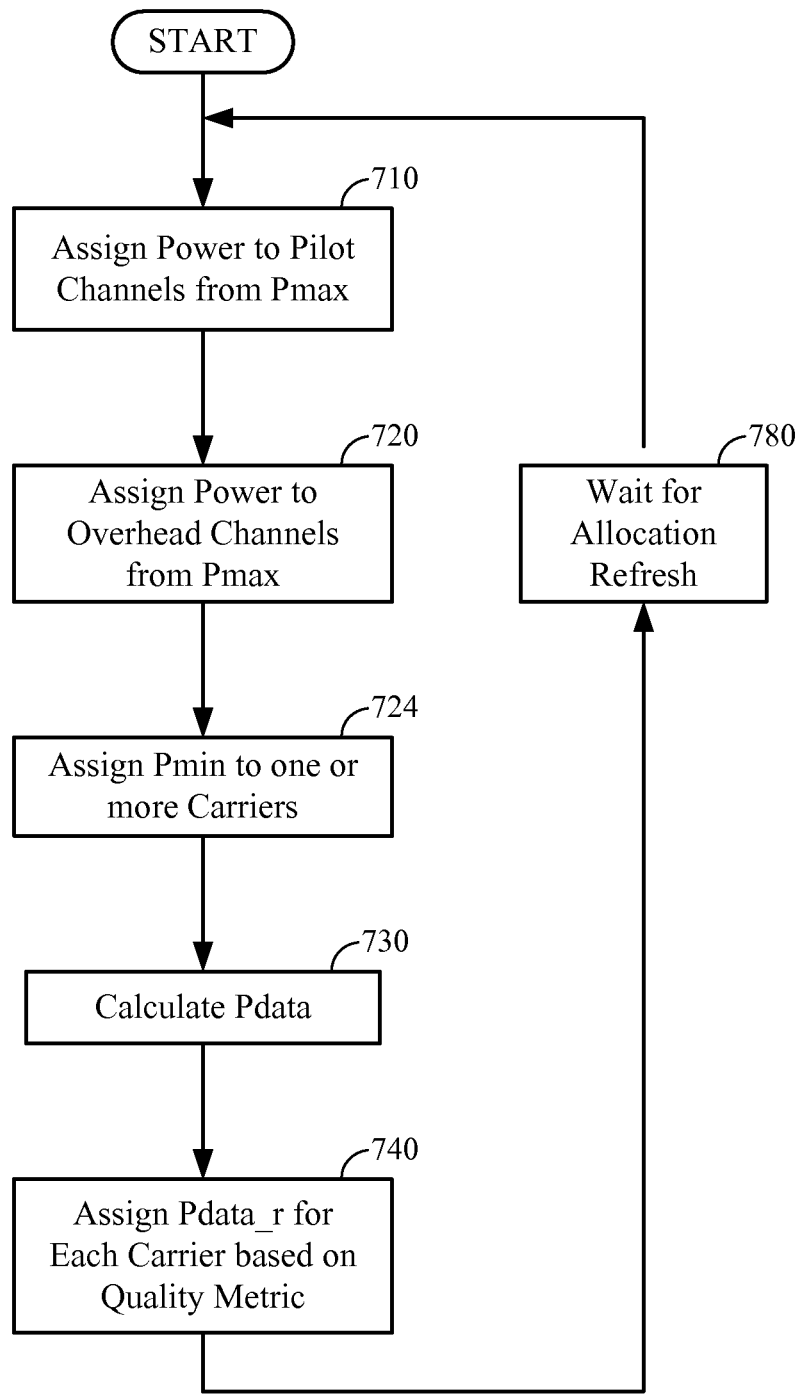
FIG. 7 illustrates a flow diagram for allocating transmit power among multiple carriers in which a minimum amount of power is allocated to one or more of the carriers.

FIG. 7 illustrates a flow diagram for allocating transmit power among multiple carriers in which a minimum amount of power is allocated to one or more of the carriers.

Following the designs of FIGS. 4A and 4B, in the design of FIG. 5 the AT initially allocates power from Pmax to each pilot channel (block 710) and to each overhead channel according to their respective gains (block 720). Before allocating transmit power across the data channels, however, in the design of FIG. 7 the AT initially allocates a minimum amount of power Pmin to each high priority carrier s among the total uplink data carriers M from the remaining transmit power (block 724). The AT thus guarantees a minimum power (and hence, a minimum data rate) to one or more high priority carriers, which ensures the AT is able close at least one link. After the minimum guaranteed power has been allocated, the amount of remaining data transmit power Pdata is calculated (block 730), and allocated among the uplink data carriers in an Eb/Nt efficient manner according to each data channel's efficiency metric (blocks 740-780).

For example, in an EV-DO system in which one or more carriers are allocated a minimum transmission power Pmin, a PA Headroom Estimation algorithm according to an embodiment of the invention calculates the total available data transmit power Pdata at time t, across all carriers r among the set of total uplink data carriers M at the AT, according to equation 5:

$$P\text{data}(t) = P\text{max} - \Sigma_{r \in M} \{p\_r(t) \times (1 + O\_r(t)) - P\text{min}\_r(t)\} \tag{5}$$

where Pmax again denotes the maximum total available transmit power at the AT, p_r(t) denotes the long-term average (e.g., filtered) transmit pilot power (an example carrier efficiency metric) in carrier r at time t, O_r(t) denotes the total uplink overhead channel gain with regard to the pilot power in carrier r at time t, and Pmin_r(t) denotes the minimum power allocated to carrier r at time t. Again, the overhead channel gain O_r(t) may include, for example, the DSC channel gain, the DRC channel gain, the RRI channel gain, the ACK channel gain, etc.

For each non-high priority carrier, Pmin_r(t) is simply set to zero. In the limit where none of the carriers r are high priority carriers, Equation 5 simply reduces to Equation 3 described above. However, for each high priority carrier s among all the carriers r in the set of total uplink data carriers M, Pmin_r(t) is set according to Equation 6:

$$P\text{min}\_r(t) = \delta\_r(t) \times p\_r(t) \times TxT2P\text{min}, \tag{6}$$

where $\delta\_r(t)$ denotes the back-off power margin with regard to the pilot power in carrier r at time t, p_r(t) denotes the long-term average (e.g., filtered) transmit pilot power (an example carrier efficiency metric) in carrier r at time t, and TxT2Pmin denotes the minimum amount of transmission T2P allocated to each high priority carrier.

Once Pmin is allocated to each high priority carrier and the remaining transmit power calculated, Pdata is allocated among the uplink data carriers in an Eb/Nt efficient manner according to each data channel's efficiency metric. Following the design of FIG. 4A, for example, in one embodiment Pdata is allocated inversely proportional to the average carrier efficiency metric of each channel. In contrast to FIG. 4A, however, in this design the minimum power Pmin is allocated before Pdata is divided among the individual uplink data carriers.

Continuing with the example EV-DO system, the PA Headroom Estimation algorithm calculates for each carrier r in the set of total uplink data carriers M at the AT, an allocated transmit power Pdata_r according to Equation 7:

$$P\text{data}\_r(t) = P\text{min}\_r(t) + P\text{data}(t) \times (1/(\text{CarrierMetric}\_r(t) \times (\Sigma_{r \in M} 1/\text{CarrierMetric}\_r(t)))), \tag{7}$$

where Pmin_r(t) denotes the minimum power allocated to carrier r at time t, Pdata(t) is calculated above from Equation 5, and CarrierMetric_r(t) denotes the desired measure of carrier efficiency. Again, for each non-high priority carrier, Pmin_r(t) is simply zero, and in the limit where none of the carriers r are high priority carriers, Equation 7 simply reduces to Equation 2 described above. It will be appreciated that the allocation of Pdata may be achieved analogously to the design of FIG. 4B as well by allocating the minimum power Pmin before Pdata is divided among the individual uplink data carriers.

One skilled in the art will appreciate that the embodiments described above regarding power margins and minimum guaranteed power allocations may be combined in some designs where one or more carriers maintain both a power margin and a minimum power allocation according to other embodiments of the invention.

Figure 8:
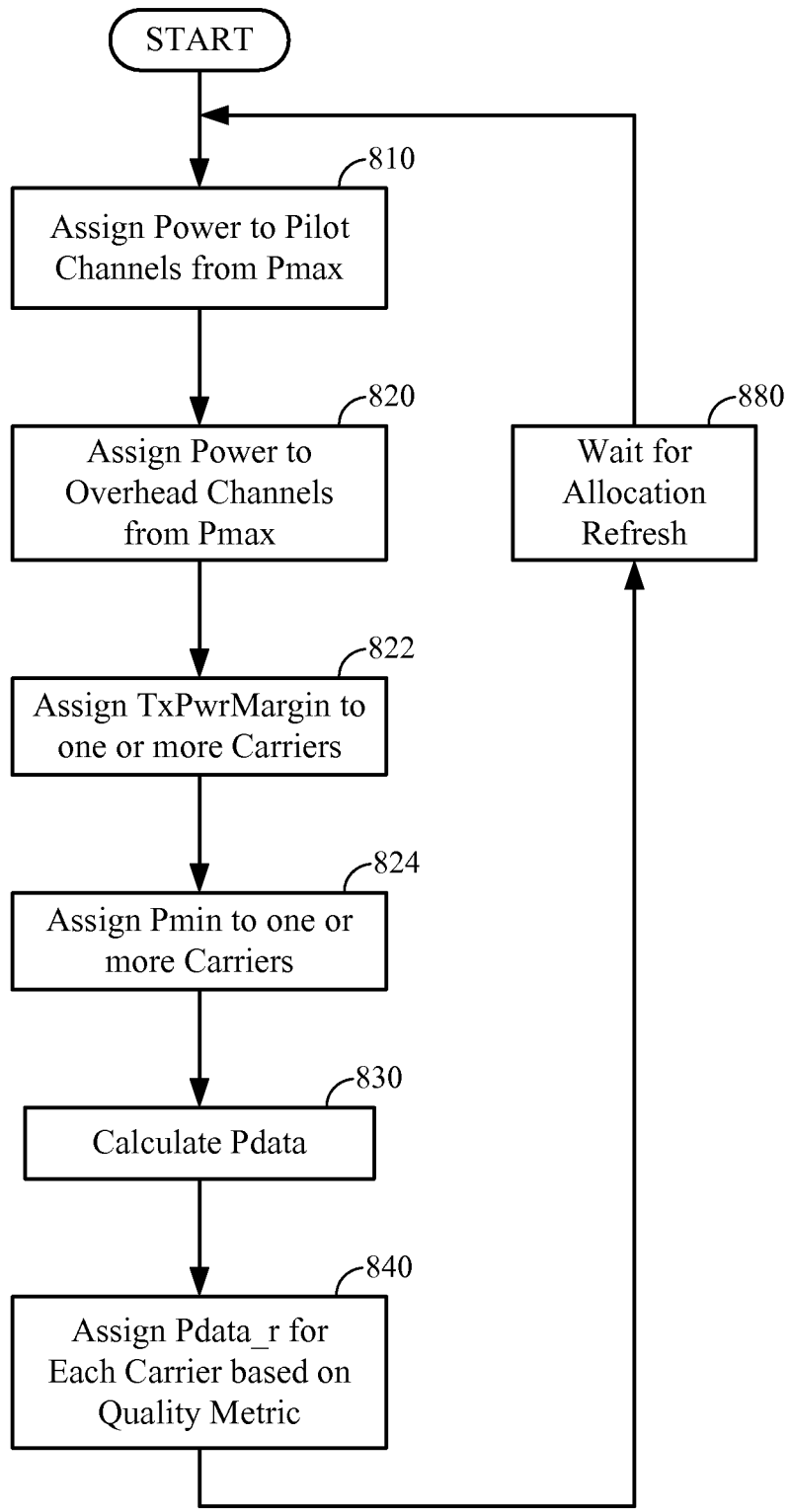
FIG. 8 illustrates a flow diagram for allocating transmit power among multiple carriers in which a power margin is maintained and in which a minimum amount of power is allocated to one or more of the carriers.

FIG. 8 illustrates a flow diagram for allocating transmit power among multiple carriers in which a power margin is maintained and in which a minimum amount of power is allocated to one or more of the carriers.

Following the designs of FIGS. 4A, 4B, 5, and 7, in the design of FIG. 8 the AT initially allocates power from Pmax to each pilot channel (block 810) and to each overhead channel according to their respective gains (block 820). Before allocating transmit power across the data channels, the AT initially allocates an adaptive backoff margin to one or more carriers from the remaining transmit power (block 822) and a minimum amount power Pmin to each high priority carrier s among the total uplink data carriers M from the remaining transmit power (block 824). After the power margins and minimum power allocations, the amount of remaining data transmit power Pdata is calculated (block 830), and allocated among the uplink data carriers in an Eb/Nt efficient manner according to each data channel's efficiency metric (blocks 840-880).

In an example EV-DO system in which one or more carriers is allocated a power margin and one or more carriers is allocated minimum guaranteed amount of power, a PA Headroom Estimation algorithm according to an embodiment of the invention calculates the total available data transmit power Pdata at time t, across all carriers r among the set of total uplink data carriers M at the AT, according to equation 8:

$$P\text{data}(t) = P\text{max} - \Sigma_{r \in M}\{\delta\_r(t) \times p\_r(t) \times (1 + O\_r(t)) - P\text{min}\_r(t)\} \quad (8)$$

where Pmax again denotes the maximum total available transmit power at the AT, $\delta\_r(t)$ denotes the back-off power margin with regard to the pilot power in carrier r at time t, $p\_r(t)$ denotes the long-term average (e.g., filtered) transmit pilot power (an example carrier efficiency metric) in carrier r at time t, $O\_r(t)$ denotes the total uplink overhead channel gain with regard to the pilot power in carrier r at time t, and Pmin denotes the minimum allocated power. Again, the overhead channel gain $O\_r(t)$ may include, for example, the DSC channel gain, the DRC channel gain, the RRI channel gain, the ACK channel gain, etc.

The PA Headroom Estimation algorithm then calculates for each carrier r in the set of total uplink data carriers M at the AT, an allocated transmit power Pdata_r. In some embodiments, the PA Headroom Estimation algorithm calculates Pdata_r as inversely proportional to a carrier efficiency metric (e.g., using Equation 7 above). In other embodiments, the PA Headroom Estimation algorithm calculates Pdata_r according to the water-filling techniques of FIG. 4B above.

Reallocation of Unused Transmit Power

As channel conditions change, certain carriers may be allocated more transmit power than they actually use. For example, one carrier could be subject to fading and experience significantly more interference as time progresses. In some cases, a given carrier's transmit power may be limited by the uplink loading. In an EV-DO system, for example, a Reverse Traffic Channel Medium Access Control (RTC-MAC) protocol determines a T2P power allocation in each carrier r for data transmissions (T2P_load_r) based on uplink loading in each carrier in each active-set sector. The AT then chooses a data rate corresponding to the transmit T2P power in a given carrier r based on the smaller of the two T2P estimates (T2P_load_r or T2P_Pmax_r). If the data rate is limited by T2P_load_r, the full allocated transmit power is not used. The AT could only have a limited amount of data to transmit, which also would not require the full allocated transmit power. The AT could also be limited by the maximum available transmission rate in a carrier, and not use the full allocated transmit power. This can happen, for example, when the AT is very close to the AP, requiring relatively less transmit power for each carrier, enabling the AT to transmit at very high rates. In any of these cases, the excess allocated transmit power is wasted on a carrier that cannot use it.

Accordingly, this portion of the disclosure provides techniques for adaptively reallocating unused power among the carriers following an initial allocation.

Figure 9:
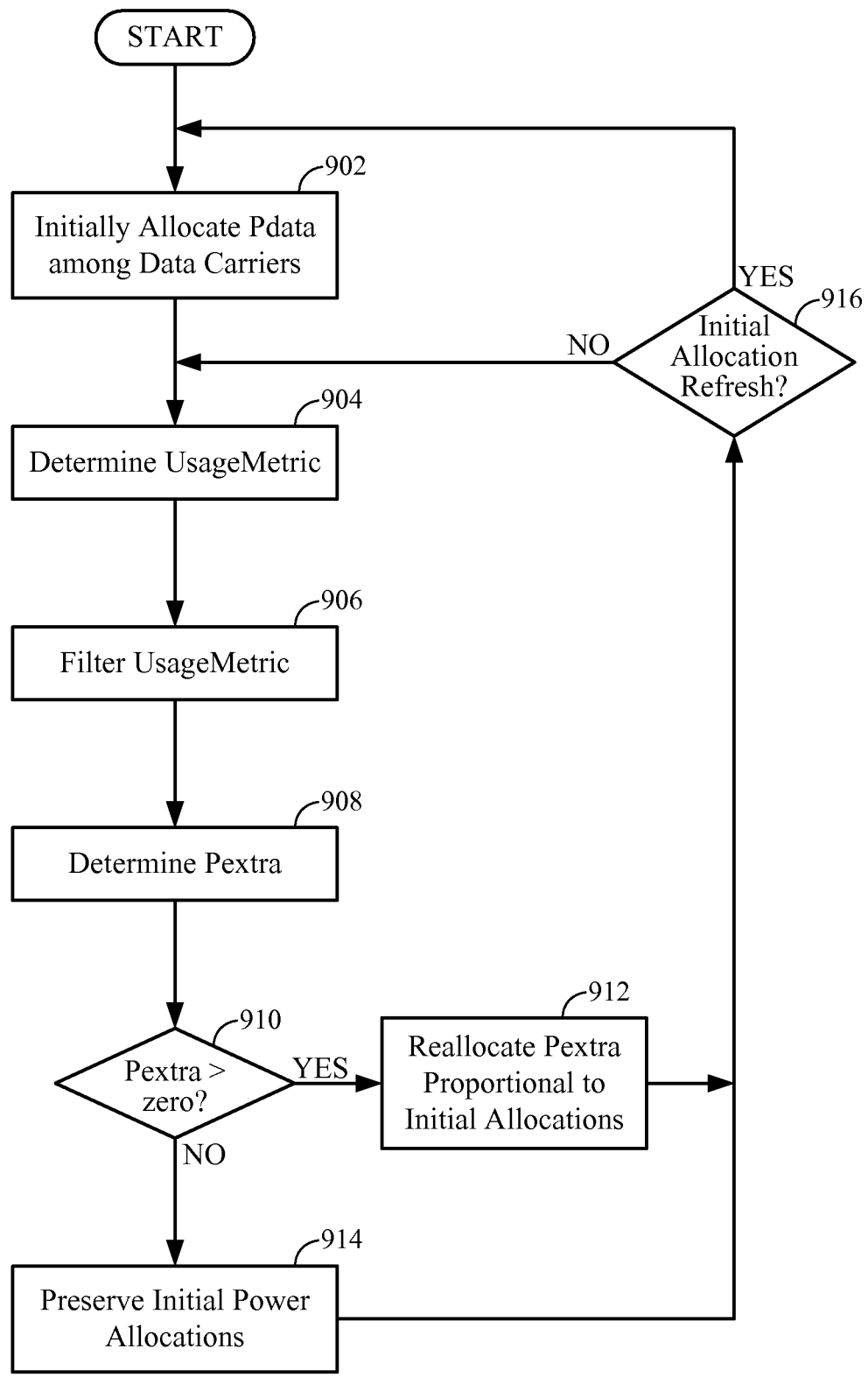
FIG. 9 is a flow diagram illustrating reallocation of transmit power among multiple carriers according to various embodiments of the invention.

FIG. 9 is a flow diagram illustrating reallocation of transmit power among multiple carriers according to various embodiments of the invention.

As shown, the AT initially allocates a certain amount of initial power to a given carrier (e.g., according to one or more of the embodiments presented above) (block 902). The AT then determines how much power is actually being used in each carrier based on a power usage metric UsageMetric (block 904). The UsageMetric is filtered over time to avoid transient oscillations and provide smoother ramping of the reallocation (block 906). For example, if the AT aggressively takes away unused power from certain carriers, inefficient transient behavior oscillations may arise in which a large amount of power is taken away from a particular carrier, only to be returned in the subsequent reallocation. These oscillations can also cause the power control loop scheme to become distorted. Filtering can be achieved by any one of the techniques described previously (e.g., single pole IIR filtering, moving window average, etc.).

Based on the determined UsageMetric for each carrier, the AT calculates any extra power Pextra available from the carriers (block 908). When extra power is available (block 910), it is reallocated to other carriers in a manner proportional to the initial allocations (block 912). Otherwise, the initial power allocations are preserved (block 914). Reallocation according to the initial proportions reduces the frequency at which full, initial allocations are needed (block 916).

For example, in an EV-DO system, the AT uses UsageMetric_r(t) as an indicator of current RTCMAC T2P usage in carrier r at time t. The UsageMetric_r(t) can be one of the state variables defined in the 3GPP2 1xEV-DO RevB standard, for example T2Poutflow, FRAB, T2PInflow summed over all RTCMAC flows, T2POutflow summed over all RTCMAC flows, or SumPotentialT2POutflow. The AT calculates the current power usage Prab_r(t) in carrier r at time t according to Equation 9:

$$Prab\_r(t) = p\_r(t) \times \text{UsageMetric}\_r(t), \quad (9)$$

where again $p\_r(t)$ denotes the long-term average (e.g., filtered) transmit pilot power (an example carrier efficiency metric) in carrier r at time t.

From Prab_r(t), the AT calculates the extra unused power Pextra(t) at time t across all carriers r in the set of total uplink data carriers M at the AT, according to Equation 10:

$$P\text{extra}(t) = P\text{data}(t) - \Sigma_{r \in M}\{P\text{data}\_r(t) + \Sigma_{r \in M}(P\text{data}\_r(t) - Prab\_r(t))\}, \quad (10)$$

where Pdata(t) is the transmit power available for all data channels and Pdata_r(t) is the transmit power available for carrier r.

Pextra(t) is then redistributed among the carriers r by calculating an adjusted power allocation Pdata_r(t) in each carrier r according to Equation 11:

$$P\text{data}\_r(t) = Prab\_r(t) + (\alpha\_r(t) / (\Sigma_{j \in M} \alpha\_j(t))) \times P\text{extra}(t), \quad (11)$$

where $\alpha\_r(t)$ denotes the ratio of Pdata_r(t) to Pdata(t). For example, $\alpha\_1(t)$ can be calculated as the ratio of Pdata_1(t) to the sum of Pdata_1(t), Pdata_2(t), etc., through Pdata_R(t). In this way, reallocation preserves the proportionality of the initial allocation.

Reallocation is performed periodically on a time scale smaller than the initial allocation described above to dynamically adjust transmission power in each carrier between full allocations. The actual frequency with which reallocation is performed is application specific, but frequent enough to account for the changing RPC commands from the AP, and hence, the changing pilot power of each carrier.

Returning to the example EV-DO system, its CDMA reverse link is typically divided into three interlaces, each interlace being made up of four slots. Here, the AT transmits once in each interlace (i.e., once every four slots), and transmits an entire sub-packet over the entire sub-frame duration (i.e., over the entire four slots). The AT receives closed loop power control commands every four slots, and runs an open loop power control algorithm once every slot. Pilot power can therefore change on a slot to slot basis. Accordingly, in one embodiment, reallocation is performed at each transmission time, i.e. every sub-frame or slot.

Data Rate

Once transmit power has been appropriately allocated according to one or more of the techniques described above, the AT can determine a maximum sustainable T2P power allocation in carrier r at time t for data transmissions (T2P_Pmax_r(t)). From T2P_Pmax_r(t), the AT can determine the maximum sustainable data rate in each carrier r at time t. To further ensure power efficiency of the system, Pdata_r(t) can be limited to the amount needed to sustain the determined maximum data rate, and any allocated but unused power in a particular carrier can be reallocated according to the techniques presented herein.

In an example EV-DO system, the AT determines T2P_Pmax_r(t) according to Equation 12:

$$T2P\_Pmax\_r(t) = Pdata\_r(t)/(\delta\_r(t) \times TxPilotPower\_r(t)) - O\_r(t) - 1, \quad (12)$$

where Pdata_r(t) denotes the total power allocated to carrier r at time t for data transmissions, δ_r(t) denotes the back-off power margin with regard to the pilot power in carrier r at time t, TxPilotPower_r(t) denotes the instantaneous transmit pilot power in carrier r at time t, and O_r(t) denotes the total uplink overhead channel gain with regard to the pilot power in carrier r at time t. Again, the overhead channel gain O_r(t) may include, for example, the DSC channel gain, the DRC channel gain, the RRI channel gain, the ACK channel gain, etc.

The AT then determines the maximum sustainable data rate in each carrier r at time t by choosing a packet size and termination target from the PowerParameters attribute configured by the AP (as defined in 3GPP2 standards) that corresponds to the largest data rate at which the transmit T2P TxT2P is still less than or equal to T2P_Pmax_r(t).

Because the data rates are discrete values, a particular carrier may be allocated more power than needed for its transmitting data rate, but not enough power to allow it to transmit at the next highest data rate. The allocated power between the two data rates is therefore not usable by that carrier. Accordingly, in some embodiments, the AT restricts Pdata for a given carrier from being greater than that required for transmitting at the determined maximum data rate. For example, if extra power is allocated to that carrier, it may be reallocated to other carriers according to the reallocation techniques presented herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It will also be appreciated that although several techniques have been presented herein in the context of multicarrier 1xEV-DO-RevB, these techniques can also be applied to other well known multicarrier systems, such as WCDMA and HSUPA, for example.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for allocating transmit power among two or more carriers in a wireless communication device. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of allocating transmit power among a plurality of carriers assigned to an access terminal, the method comprising:
    determining, at the access terminal, a total amount of data transmit power available at the access terminal for data transmission over the plurality of carriers;
    determining, at the access terminal, an efficiency metric for each carrier of the plurality of carriers, wherein the efficiency metric is determined without a priori knowledge of a required signal-to-noise ratio (SNR); and
    allocating, at the access terminal, a first portion of the total amount of data transmit power to each carrier of the plurality of carriers based on the determined efficiency metric of the carrier.

2. The method of claim 1, wherein the efficiency metric indicates a level of interference and channel condition in a particular carrier.

3. The method of claim 2, wherein the allocation is inversely proportional to the level of interference in each carrier of the plurality of carriers.

4. The method of claim 1, wherein the efficiency metric is a measure of power used in transmitting each data bit on a particular carrier, the allocation being performed according to a water-filling algorithm.

5. The method of claim 4, wherein the water-filling algorithm allocates larger portions of the total amount of data transmit power to carriers of the plurality of carriers that use relatively less power in transmitting each data bit.

6. The method of claim 1, wherein the efficiency metric is based on an average transmit pilot power for a particular carrier or a filtered reverse activity bit for the particular carrier.

7. The method of claim 1, wherein the allocation is performed periodically.

8. The method of claim 1, further comprising allocating, at the access terminal, a second portion of the total amount of data transmit power to one or more carriers of the plurality of carriers as a power margin, wherein the power margin corresponds to an amount of power reserved by the access terminal for use in increasing the first portion of the total amount of data transmit power allocated to the one or more carriers in response to a reverse power control (RPC) command received by the one or more carriers, and wherein at least a portion of the power margin becomes available to the access terminal for use in data transmission via the one or more carriers after receiving the RPC command.

9. The method of claim 8, wherein each power margin is dynamically adjusted based on updated channel conditions.

10. The method of claim 8, further comprising:
increasing the power margin by a first increment in response to a determination that a total transmit pilot power of a particular carrier is greater than a transmit power threshold; and
decreasing the power margin by a second increment in response to a determination that the total transmit pilot power of the particular carrier is not greater than the transmit power threshold, wherein the first increment is greater than the second increment.

11. The method of claim 10, wherein a ratio of the first increment to the second increment corresponds to a percentage of time that the total transmit pilot power of the particular carrier exceeds the transmit power threshold.

12. The method of claim 1, further comprising allocating, at the access terminal, at least a second portion of the total amount of data transmit power to one or more carriers of the plurality of carriers before allocating the first portion of the total amount of data transmit power to each carrier of the plurality of carriers, the second portion of the total amount of data transmit power being sufficient to sustain a particular data rate in each of the one or more carriers.

13. The method of claim 1, further comprising:
determining a usage metric for each carrier of the plurality of carriers corresponding to an amount of power being used at the carrier;
determining an amount of unused power across the plurality of carriers based on the first portion of the total amount of data transmit power allocated to each carrier of the plurality of carriers and the usage metric for each carrier of the plurality of carriers; and
reallocating the unused power among the plurality of carriers.

14. The method of claim 11, wherein the amount of unused power is reallocated in a manner proportional to the allocation of the first portion of the total amount of data transmit power.

15. The method of claim 11, wherein reallocation is performed periodically.

16. The method of claim 1, further comprising calculating a particular data rate for data transmission over each carrier of the plurality of carriers based on the first portion of the total amount of data transmit power allocated to the carrier.

17. An access terminal for communicating with a communication network over a plurality of carriers assigned to the access terminal, the access terminal comprising:

logic configured to determine, at the access terminal, a total amount of data transmit power available at the access terminal for data transmission over the plurality of carriers;
logic configured to determine, at the access terminal, an efficiency metric for each carrier of the plurality of carriers, wherein the efficiency metric is determined without a priori knowledge of a required signal-to-noise ratio (SNR); and
logic configured to allocate, at the access terminal, a first portion of the total data transmit power to each carrier of the plurality of carriers based on the determined efficiency metric of the carrier.

18. The access terminal of claim 17, wherein the efficiency metric indicates a level of interference and a channel condition in a particular carrier.

19. The access terminal of claim 18, wherein the allocation is inversely proportional to the level of interference in each carrier of the plurality of carriers.

20. The access terminal of claim 17, wherein the efficiency metric is a measure of power used in transmitting each data bit on a particular carrier, the allocation being performed according to a water-filling algorithm.

21. The access terminal of claim 20, wherein the water-filling algorithm allocates larger portions of the total amount of data transmit power to carriers of the plurality of carriers that use relatively less power in transmitting each data bit.

22. The access terminal of claim 17, wherein the efficiency metric is based on an average transmit pilot power for a particular carrier or a filtered reverse activity bit for the particular carrier.

23. The access terminal of claim 17, wherein the allocation is performed periodically.

24. The access terminal of claim 17, further comprising logic configured to allocate, at the access terminal, a second portion of the total amount of data transmit power to one or more carriers of the plurality of carriers as a power margin, wherein the power margin corresponds to an amount of power reserved by the access terminal for use in increasing the first portion of the total amount of data transmit power allocated to the one or more carriers in response to a reverse power control (RPC) command received by the one or more carriers, and wherein at least a portion of the power margin becomes available to the access terminal for use in data transmission via the one or more carriers after receiving the RPC command.

25. The access terminal of claim 24, wherein each power margin is dynamically adjusted based on updated channel conditions.

26. The access terminal of claim 17, further comprising logic configured to allocate, at the access terminal, at least a second portion of the total amount of data transmit power to one or more carriers of the plurality of carriers before allocating the first portion of the total amount of data transmit power to each carrier of the plurality of carriers, the second portion of the total amount of data transmit power being sufficient to sustain a particular data rate in each of the one or more carriers.

27. The access terminal of claim 17, further comprising:
logic configured to determine a usage metric for each carrier of the plurality of carriers corresponding to an amount of power being used at the carrier;
logic configured to determine an amount of unused power across the plurality of carriers based on the first portion of the total amount of data transmit power in each carrier of the plurality of carriers and the usage metric for each carrier of the plurality of carriers; and logic configured to reallocate the amount of unused power among the plurality of carriers.

28. The access terminal of claim 27, wherein the unused power is reallocated in a manner proportional to the allocation of the first portion of the total amount of data transmit power.

29. The access terminal of claim 27, wherein reallocation is performed periodically.

30. The access terminal of claim 17, further comprising logic configured to calculate a particular data rate for data transmission over each carrier of the plurality of carriers based on the first portion of the total amount of data transmit power allocated to the carrier.

31. An access terminal for communicating with a communication network over a plurality of carriers assigned to the access terminal, the access terminal comprising:
    means for determining, at the access terminal, a total amount of data transmit power available at the access terminal for data transmission over the plurality of carriers;
    means for determining, at the access terminal, an efficiency metric for each carrier of the plurality of carriers, wherein the efficiency metric is determined without a priori knowledge of a required signal-to-noise ratio (SNR); and
    means for allocating, at the access terminal, a first portion of the total data transmit power to each carrier of the plurality of carriers based on the determined efficiency metric of the carrier.

32. The access terminal of claim 31, wherein the efficiency metric indicates a level of interference and channel condition in a particular carrier.

33. The access terminal of claim 32, wherein the allocation is inversely proportional to the level of interference in each carrier of the plurality of carriers.

34. The access terminal of claim 31, wherein the efficiency metric is a measure of power used in transmitting each data bit on a particular carrier, the allocation being performed according to a water-filling algorithm.

35. The access terminal of claim 34, wherein the water-filling algorithm allocates larger portions of the total amount of data transmit power to carriers of the plurality of carriers that use relatively less power in transmitting each data bit.

36. The access terminal of claim 31, wherein the efficiency metric is based on an average transmit pilot power for a particular carrier or a filtered reverse activity bit for the particular carrier.

37. The access terminal of claim 31, wherein the allocation is performed periodically.

38. The access terminal of claim 31, further comprising means for allocating, at the access terminal, a second portion of the total amount of data transmit power to one or more carriers of the plurality of carriers as a power margin, wherein the power margin corresponds to an amount of power reserved by the access terminal for use in increasing the first portion of the total amount of data transmit power allocated to the one or more carriers in response to a reverse power control (RPC) command received by the one or more carriers, and wherein at least a portion of the power margin becomes available to the access terminal for use in data transmission via the one or more carriers after receiving the RPC command.

39. The access terminal of claim 38, wherein each power margin is dynamically adjusted based on updated channel conditions.

40. The access terminal of claim 31, further comprising means for allocating, at the access terminal, at least a second portion of the total amount of data transmit power to one or more carriers of the plurality of carriers before allocating the first portion of the total amount of data transmit power to each carrier of the plurality of carriers, the second portion of the total amount of data transmit power being sufficient to sustain a particular data rate in each of the one or more carriers.

41. The access terminal of claim 31, further comprising:
    means for determining a usage metric for each carrier of the plurality of carriers corresponding to an amount of power being used at the carrier;
    means for determining an amount of unused power across the plurality of carriers based on the first portion of the total amount of data transmit power allocated to each carrier of the plurality of carriers and the usage metric for each carrier of the plurality of carriers; and
    means for reallocating the unused power among the plurality of carriers.

42. The access terminal of claim 41, wherein the unused power is reallocated in a manner proportional to the allocation of the first portion of the total amount of data transmit power.

43. The access terminal of claim 41, wherein reallocation is performed periodically.

44. The wireless communication device of claim 31, further comprising means for calculating a particular data rate for data transmission over each carrier of the plurality of carriers based on the first portion of the total amount of data transmit power allocated to the carrier.

45. A non-transitory computer readable medium comprising code, which, when executed by a processor, causes the processor to perform operations for allocating transmit power among a plurality of carriers assigned to an access terminal, the computer readable medium comprising:
    code for determining, at the access terminal, a total amount of data transmit power available at the access terminal for data transmission over the plurality of carriers;
    code for determining, at the access terminal, an efficiency metric for each carrier of the plurality of carriers, wherein the efficiency metric is determined without a priori knowledge of a required signal-to-noise ratio (SNR); and
    code for allocating, at the access terminal, a first portion of the total amount of data transmit power to each carrier of the plurality of carriers based on the determined efficiency metric of the carrier.

46. The computer readable medium of claim 45, wherein the efficiency metric indicates a level of interference and channel condition in a particular carrier.

47. The computer readable medium of claim 46, wherein the allocation is inversely proportional to the level of interference in each carrier of the plurality of carriers.

48. The computer readable medium of claim 45, wherein the efficiency metric is a measure of power used in transmitting each data bit on a particular carrier, the allocation being performed according to a water-filling algorithm.

49. The computer readable medium of claim 48, wherein the water-filling algorithm allocates larger portions of the total amount of data transmit power to carriers of the plurality of carriers that use relatively less power in transmitting each data bit.

50. The computer readable medium of claim 45, wherein the efficiency metric is based on an average transmit pilot power for a particular carrier or a filtered reverse activity bit for the particular carrier.

51. The computer readable medium of claim 45, wherein the allocation is performed periodically.

52. The computer readable medium of claim 45, further comprising code for allocating, at the access terminal, a second portion of the total amount of data transmit power to one or more carriers of the plurality of carriers as a power margin, wherein the power margin corresponds to an amount of power reserved by the access terminal for use in increasing the first portion of the total amount of data transmit power allocated to the one or more carriers in response to a reverse power control (RPC) command received by the one or more carriers, and wherein at least a portion of the power margin becomes available to the access terminal for use in data transmission via the one or more carriers after receiving the RPC command.

53. The computer readable medium of claim 52, wherein each power margin is dynamically adjusted based on updated channel conditions.

54. The computer readable medium of claim 45, further comprising code for allocating, at the access terminal, at least a second portion of the total amount of data transmit power to one or more carriers of the plurality of carriers before allocating the first portion of the total data transmit power to each carrier of the plurality of carriers, the second portion of the total amount of data transmit power being sufficient to sustain a particular data rate in each of the one or more carriers.

55. The computer readable medium of claim 45, further comprising:

code for determining a usage metric for each carrier of the plurality of carriers corresponding to an amount of power being used at the carrier;
    code for determining an amount of unused power across the plurality of carriers based on the first portion of the total amount of data transmit power allocated to each carrier and the usage metric for each carrier of the plurality of carriers; and
    code for reallocating the unused power among the plurality of carriers.

56. The computer readable medium of claim 55, wherein the unused power is reallocated in a manner proportional to the allocation of the first portion of the total amount of data transmit power.

57. The computer readable medium of claim 55, wherein reallocation is performed periodically.

58. The computer readable medium of claim 45, further comprising code for calculating a particular data rate for data transmission over each carrier of the plurality of carriers based on the first portion of the total amount of data transmit power allocated to the carrier.

* * * * *